US012665466B2

(12) United States Patent　　　　　(10) Patent No.:　US 12,665,466 B2
Ruppert　　　　　　　　　　　　　　 (45) Date of Patent:　Jun. 23, 2026

(54) HIGH-VOLTAGE TERMINAL WITH ATTACHED STAR RAIL AND TOLERANCE COMPENSATION

(71) Applicant: Schaeffler Technologies AG & Co. KG, Herzogenaurach (DE)

(72) Inventor: Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 176 days.

(21) Appl. No.: 18/292,298

(22) PCT Filed: Jul. 4, 2022

(86) PCT No.: PCT/DE2022/100480

§ 371 (c)(1),
(2) Date: Jan. 25, 2024

(87) PCT Pub. No.: WO2023/006140

PCT Pub. Date: Feb. 2, 2023

(65) Prior Publication Data

US 2024/0339890 A1　　　Oct. 10, 2024

(30) Foreign Application Priority Data

Jul. 30, 2021　(DE) ......................... 102021119870.4

(51) Int. Cl.
H02K 5/22　　　　　(2006.01)
(52) U.S. Cl.
CPC .................................... H02K 5/225 (2013.01)

(58) Field of Classification Search
CPC ........... H02K 3/50; H02K 3/52; H02K 3/521; H02K 3/522; H02K 5/22; H02K 5/225
See application file for complete search history.

(56) References Cited

U.S. PATENT DOCUMENTS

2014/0028127 A1 *　1/2014　Chamberlin ........... H02K 3/522
　　　　　　　　　　　　　　　　　　　　310/71
2018/0254678 A1 *　9/2018　Matsuzaki ............. H02K 5/225
　　　　　　　　(Continued)

FOREIGN PATENT DOCUMENTS

DE　　　102018207224 A1 *　11/2019　.............. H02K 3/32
DE　　　102019111825 A1　　 11/2020
WO　　　WO-2021025179 A1 *　2/2021　............. H02K 3/505

OTHER PUBLICATIONS

Krabus, Machine Translation of DE102018207224, Nov. 2019 (Year: 2019).*

(Continued)

*Primary Examiner* — Eric Johnson
(74) *Attorney, Agent, or Firm* — Suiter Swantz IP

(57)　　　　　ABSTRACT

The present invention relates to a high-voltage terminal (1) for a stator of an electric machine, having multiple first interconnection elements (2) that are designed to establish electrical contact between contact pins of a stator winding and contact connections of power electronics so as to drive the electric machine, a second interconnection element (3) that is designed to establish electrical contact between contact pins of a stator winding so as to create a star phase, and a receiving element (4) that centres and fixes the second interconnection element (3) in a form-fitting manner. The invention furthermore relates to an electric machine comprising a high-voltage terminal according to the invention.

18 Claims, 4 Drawing Sheets

(56)             References Cited

U.S. PATENT DOCUMENTS

2021/0057957 A1*   2/2021   Hwang  .................. H02K 15/33
2022/0247265 A1*   8/2022   Seo  ........................ H02K 5/225

OTHER PUBLICATIONS

Ahn, Machine Translation of WO2021025179, Feb. 2021 (Year: 2021).*

European Patent Office, International Search Report received in International Application No. PCT/DE2022/100480, Oct. 24, 2022, 24 pages (including translation).

* cited by examiner

4a)

4b)

HIGH-VOLTAGE TERMINAL WITH ATTACHED STAR RAIL AND TOLERANCE COMPENSATION

CROSS-REFERENCE TO RELATED APPLICATION

The present application is the U.S. National Phase of PCT Patent Application Number PCT/DE2022/100480, filed on Jul. 4, 2022, which claims priority to German Patent Application Number 10 2021 119 870.4, filed on Jul. 30, 2021, the entire disclosures of which are incorporated by reference herein.

TECHNICAL FIELD

The present disclosure relates to a high-voltage terminal for a stator of an electric machine, and to an electric machine comprising a high-voltage terminal according to the disclosure.

BACKGROUND

Permanently excited synchronous machines (PSM) are already used in many industrial applications and, in the course of electrification, increasingly also in the automotive industry. Such a permanently excited synchronous machine usually has a stator to be energized and a permanently excited rotor. The stator comprises, among other things, a stator winding, a stator carrier, an interconnection ring, and a terminal for the power electronics.

Electric machines with distributed winding or wave winding usually have an interconnection region in which different conductors of the winding are connected to one another. This coupling is also referred to as a bridge, which is usually responsible for reversing the direction of the current flow. Furthermore, the interconnection can also contain a so-called star point or star phase. At this point, all conductors and currents of the different phases flow together according to a star connection. As a further component, the electric machine has a high-voltage terminal. This component is responsible for the power supply of the electric machine via the power electronics.

High-voltage terminals with an integrated interconnection region are known from the prior art. For example, DE 10 2019 111 825 A1 discloses a stator for an electric machine with such a high-voltage terminal.

SUMMARY

Although such components are known from the prior art, there still exists a desire to optimize them. Therefore, it is the object of the present disclosure to provide a high-voltage terminal that is improved in relation to the prior art. In particular, to provide a high-voltage terminal that allows integration into a limited installation space of a stator or a stator winding in a manner that is as compact as possible.

Furthermore, it is an object of the present disclosure to provide an electric machine that is improved in relation to the prior art.

The object is achieved by the measures described in the independent claims. Further advantageous embodiments are set forth in the independent claims.

According to one aspect, a high-voltage terminal for a stator of an electric machine has multiple first interconnection elements that are designed to establish electrical contact between contact pins of a stator winding and contact connections of power electronics so as to drive the electric machine. Furthermore, the high-voltage terminal has a second interconnection element that is designed to establish electrical contact between contact pins of a stator winding so as to create a star phase. Furthermore, the high-voltage terminal has a receiving element that centers and fixes the second interconnection element in a form-fitting manner.

Advantageously, this results in a simplified mounting and easier handling of the high-voltage terminal on the stator, since in particular the second interconnection element, which is also referred to as the star rail, is fixed by the receptacle in such a way that unintentional separation is ruled out as far as technically possible. It is further advantageous that the position of the second interconnection element in relation to other components of the electric machine, in particular within the stator, is defined in such a way that downstream manufacturing steps can be carried out more safely.

According to one embodiment, the high-voltage terminal has a plastic element which surrounds the multiple first interconnection elements at least in sections and thus centers and fixes them in a materially bonded manner.

Advantageously, the plastic element fixes the interconnection elements, designed as a busbar, in their spatial position relative to other components of the electric machine, in particular within the stator. This results in a simplified mounting of the high-voltage terminal on the stator. Particularly advantageously, the plastic element is designed as a potting or injection molding element.

According to one embodiment, the plastic element and the receiving element are integrally formed from a single component.

The advantageous effect of this embodiment is the reduced manufacturing costs, in particular when the plastic element is designed as a potting or injection molding element.

According to one embodiment, the receiving element comprises multiple centering domes which center and fix the second interconnection element radially or in the circumferential direction in a force-fitting or form-fitting manner.

Particularly advantageously, the receiving element comprises multiple centering domes arranged distributed over the plastic element. In a particularly advantageous embodiment, multiple centering domes are structurally connected to one another, in particular by a thin-walled element. In an advantageous embodiment, at least two centering domes, in each case, interact either radially or in the circumferential direction and thus center the second interconnection element.

According to one embodiment, one of the first interconnection elements has a connection region to the contact connections of the power electronics, which is designed to establish a connection by means of a screw connection.

Advantageously, the screw connections are each designed as a threaded bushing, which is introduced into one of the first interconnection elements. Particularly advantageously, the threaded bushing is connected to one of the first interconnection elements in a form-fitting or materially bonded manner, in particular they are press-fitted. In a particularly preferred embodiment, the screw connections have a tolerance compensation in the radial direction and in the circumferential direction, in particular by means of a screw connection which is arranged loosely in a receiving space of a receptacle on one of the first interconnection elements, which is connected to one of the first interconnection elements in a form-fitting or materially bonded manner.

According to one embodiment, the high-voltage terminal has a mounting element which is designed to center and fix the high-voltage terminal to an element of the electric machine, in particular a stator carrier.

Advantageously, the high-voltage terminal is mounted from the axial direction on the stator, in particular on a stator carrier, by means of a screw connection. It can be particularly advantageous here if the high-voltage terminal has multiple mounting elements.

According to one embodiment, the mounting element has a bushing with a centering collar.

The advantageous effect of this embodiment is the separation of the functions of centering or spatial arrangement of the high-voltage terminal from the function of fixing via a suitable fastening means, in particular a screw connection. Particularly advantageously, the bushing is made of a metal and is received as a so-called insert in the mounting element.

According to one embodiment, the mounting element and the plastic element are integrally formed from one component.

The advantageous effect of this embodiment is the reduced manufacturing costs, in particular when the plastic element is designed as a potting or injection molding element.

According to one embodiment, the second interconnection element is arranged in a plane perpendicular to a rotational axis of the electric machine between a first radius R1 and a second radius R2, each extending around the rotational axis, and is formed in a meandering manner by multiple bends.

Particularly advantageously, the second interconnection element therein forms multiple sections on the radius R1, between which loops are arranged. In this context, the radius R1 is smaller than the radius R2. The advantageous effect of this embodiment is the increase of clearances and creepage distances within the high-voltage terminal from the first interconnection element to the second interconnection element, in particular in the region of the loops. A further advantageous effect can be seen in the interaction of the meandering design of the second interconnection element with the centering domes of the receiving element. As such, multiple centering domes can apply a holding force in opposite directions or implement a corresponding form-fit, in particular within a loop.

According to one aspect, an electric machine comprises a high-voltage terminal according to the aspect described above or any of the embodiments described above.

Advantageously, a stator of an electric machine comprises a high-voltage terminal according to the aspect described above or any of the embodiments described above.

For the purposes of the present disclosure, the term "continuous mat" is understood to mean a stator winding which is usually wound and folded multiple times. In particular, this is a wave winding.

For the purposes of the present disclosure, the term "plastic element" is understood to mean a component which is formed from a plastic and/or from a material similar to a plastic.

This can be formed, for example, from a plastic film, such as a polyimide film, or a potting composite based on epoxy resin and/or acrylate. Similarly, the plastic element can be produced from a granulate by injection molding. Further, the plastic element can also be formed of interconnectable components formed of, preferably consisting of, a plastic commonly used in electrical applications, such as polyphenylene sulfide (PPS), polyphthalamide (PPA), polyetheretherketone (PEEK), and/or mixtures thereof.

For the purposes of the present disclosure, the term "materially bonded connections" is understood to mean connections produced by processes in which the connection partners are held together by atomic or molecular forces. At the same time, they are non-detachable connections that can only be separated by destroying the connecting means. Processes here are in particular bonding, welding, soldering or vulcanization.

For the purposes of the present disclosure, the term "form-fitting connections" is understood to mean connections in which at least two connection partners engage in one another. As a result, the connection partners cannot disengage even without power transmission or in case of interrupted power transmission. In particular, the form-fit can also be achieved by thermal action or pressure on one of the connection partners, for example by local melting, hot caulking or extrusion.

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size relationships shown are only schematic in nature. Identical reference symbols indicate the same objects, so that, where applicable, explanations from other figures can also be used. Terms such as "radial", "axial" or similar refer to the rotational axis of the electric machine, unless a different reference is explicitly used. Furthermore, in order to improve the readability of the figures, only individual or a few identical elements of a reference symbol are provided in some cases.

DESCRIPTION OF EMBODIMENTS

Figure 1:
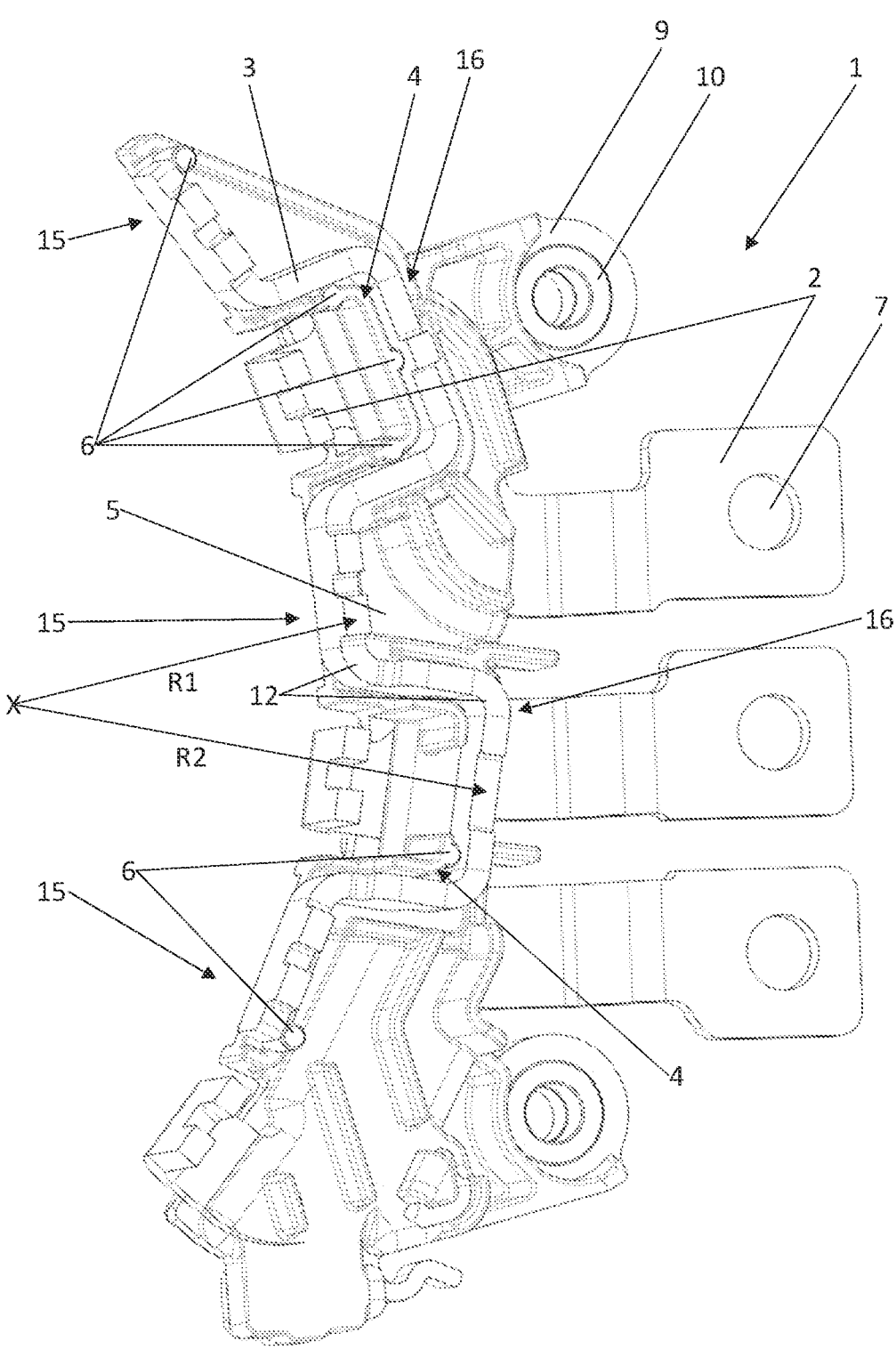
FIG. 1 shows a top view of a high-voltage terminal.
Figure 2:
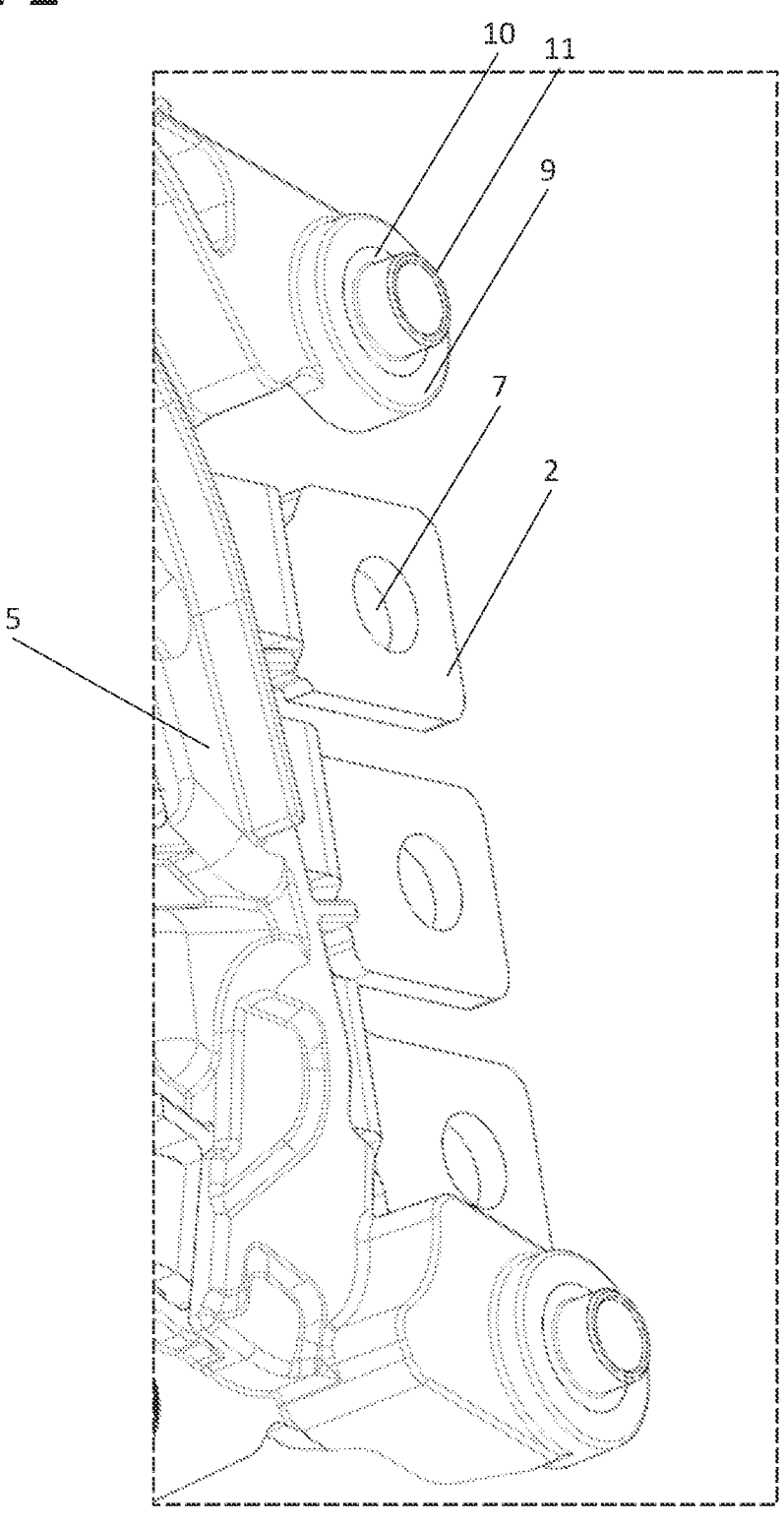
FIG. 2 shows a partial perspective view of the high-voltage terminal of FIG. 1.
Figure 3:
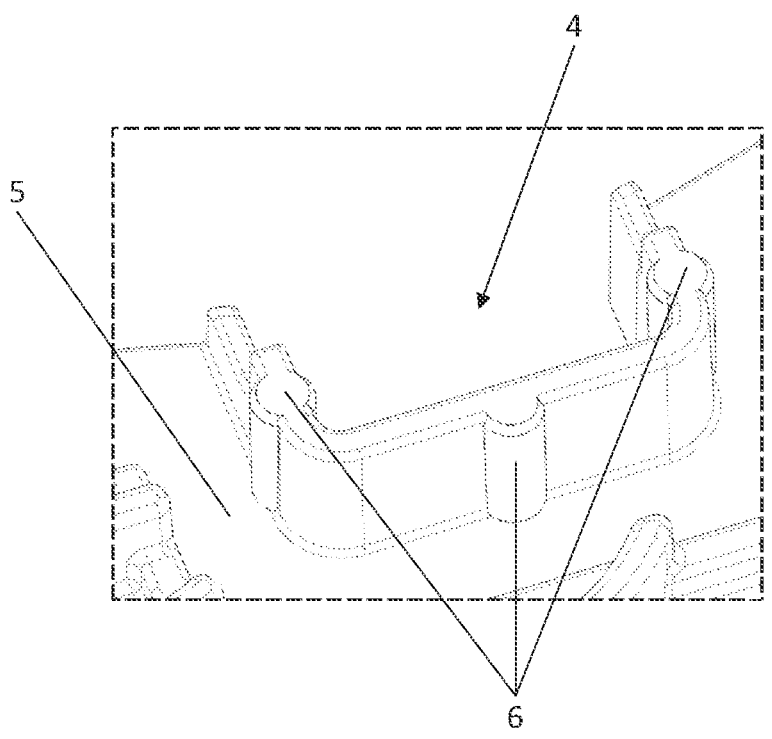
FIG. 3 shows a partial perspective view of the receiving element of the high-voltage terminal of FIG. 1.

FIG. 1 shows a top view of a high-voltage terminal 1, which comprises three first interconnection elements 2 designed as busbars. The interconnection elements 7 are designed to establish electrical contact between contact pins of a stator winding and contact connections of power electronics so as to drive the electric machine. For this purpose, each first interconnection element 2 comprises a respective connection region 7. The connection region 7 is designed here as a through opening, wherein the through opening is many times larger than one of the contact connections of the power electronics designed as a screw connection, so that a tolerance compensation is possible. The first interconnection elements 2 are fixed in a plastic element 5 in a materially bonded manner, which is designed as an injection molded element. The plastic element 5 has two mounting elements 9 which are designed to center and fix the high-voltage terminal to an element of the electric machine, in particular a stator carrier. Two bushings 10 are inserted in each of the mounting elements 9, which have a centering collar 11 as shown in FIG. 2. The bushings 10 allow the high-voltage terminal 1 to be fixed on the stator carrier, for example, in particular by means of a screw connection. The bushing 10 with the centering collar 11 implements a separation of the functions of centering or spatial arrangement of the high-voltage terminal 1 from the function of fixing by the screw connection. The plastic element 5 integrally forms a receiving element 4 for a second interconnection element 3, which extends in the axial direction and comprises six centering domes 6, which are combined into three functional pairs of two centering domes 6 each. The second interconnection element has multiple bends 12, such that the second interconnection element is formed in a meandering manner between a first radius R1 and a second radius R2. In this context, the radius R1 is smaller than the radius R2. The second interconnection element 3 forms three sections 15 on the radius R1 and two loops 16. Two pairs of the centering domes 6 fix the second interconnection element 3 in the axial direction, wherein one centering dome 6 each of the pair rests against one of the outer sections 15 and one centering dome 6 of the pair rests against the adjacent loop 16. One pair of the centering domes 6 centers the second interconnection element 3 within a loop 16 in the circumferential direction. FIG. 3 shows a partial view of this pair and of a centering dome of a pair for axial fixation. The second interconnection element 3 is designed to establish electrical contact between contact pins of a stator winding so as to create a star phase. In this regard, the second interconnection element 3 has regions in the region of the sections 15 which are designed to implement a materially bonded connection with the stator winding.

FIG. 2 shows a perspective view of the high-voltage terminal from FIG. 1, wherein the perspective is selected such that in particular the centering collar 11 of the bushing 10 in the mounting element 9 is visible. The centering collar 11 extends axially beyond the mounting element and is designed to center the high-voltage terminal 1, introduced in a corresponding recess in particular of a stator carrier. The bushing 10 has a through opening, so that the high-voltage terminal 1 can be fixed through the bushing 10, in particular by means of a screw connection. The bushing 10 with the centering collar 11 implements a separation of the functions of centering or spatial arrangement of the high-voltage terminal 1 from the function of fixing by the screw connection.

FIG. 3 shows a partial perspective view of the receiving element 4 of the high-voltage terminal 1 of FIG. 1. Three centering domes 6 of the receiving element 4 are structurally connected to one another by a thin-walled element. In this regard, the centering domes 6 and the thin-walled element are integrally connected to and formed from the plastic element 5. The two centering domes 6 arranged on the left and right in the image plane form the pair which centers the second interconnection element 3, not shown in FIG. 3, in the circumferential direction within a loop 16.

Figure 4:
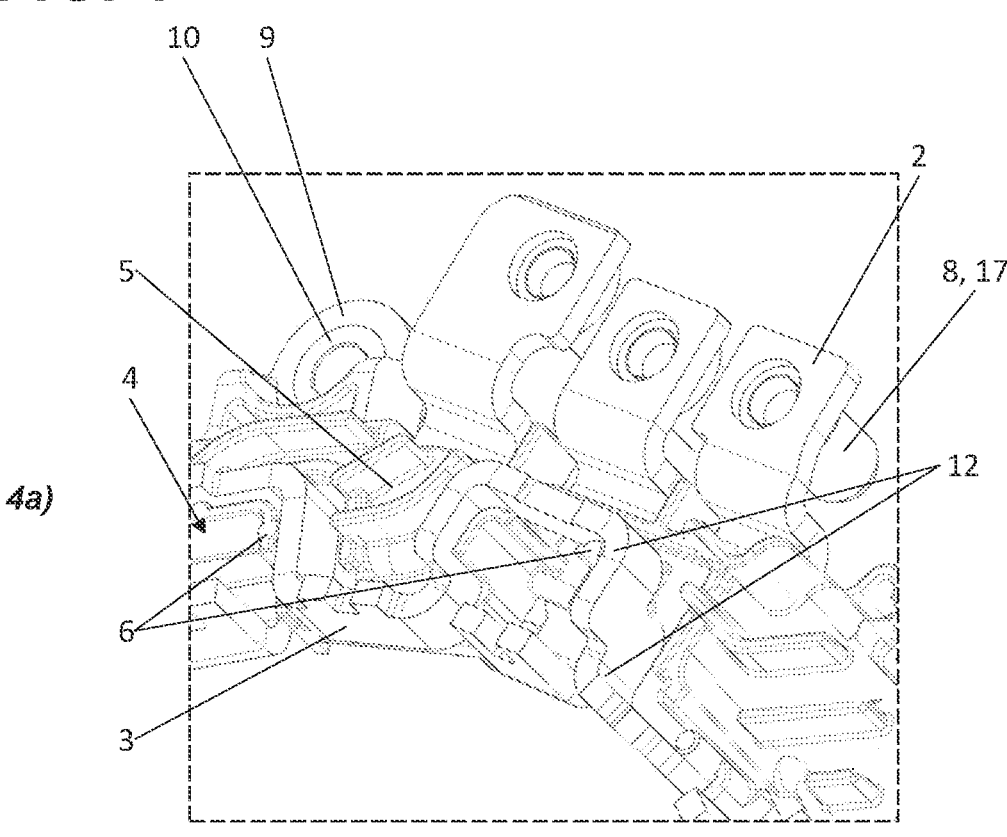
FIG. 4 shows several embodiments of a screw connection of the high-voltage terminal of FIG. 1.
Figure 4:
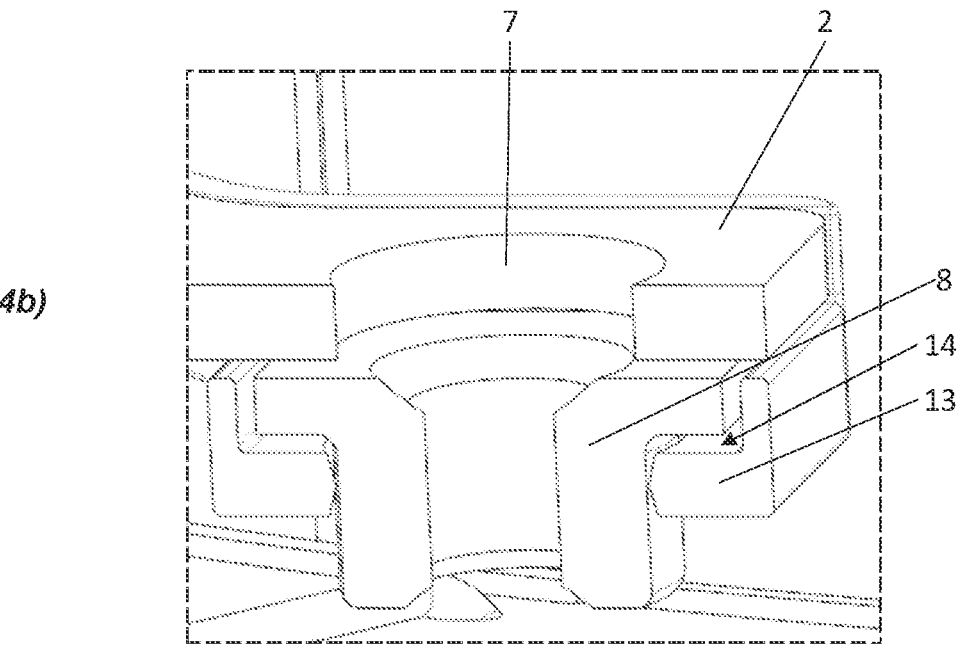

FIG. 4 shows several embodiments of a screw connection 8 of the high-voltage terminal of FIG. 1. In FIG. 4*a*), threaded bushings 17 are pressed into the connection regions 7 of the first interconnection elements. FIG. 4*b*) shows screw connections 8, which have a tolerance compensation in the radial direction and in the circumferential direction. The tolerance compensation is implemented by a threaded bushing 17, which is arranged loosely but in particular secured against rotation by an outer contour in a receiving space 14 of a receptacle 13 on one of the first interconnection elements 2, which is connected to the first interconnection element 2 in a form-fitting or materially bonded manner.

LIST OF REFERENCE SYMBOLS

1. High-voltage terminal
2. First interconnection element
3. Second interconnection element
4. Receiving element
5. Plastic element
6. Centering domes
7. Connection region
8. Screw connection
9. Mounting element
10. Bushing
11. Centering collar
12. Bends
13. Receptacle
14. Receiving space
15. Section
16. Loop
17. Threaded bushing
R1 First radius
R2 Second radius

The invention claimed is:

1. A high-voltage terminal for a stator of an electric machine comprising:

a plurality of first interconnection elements configured to establish electrical contact between contact pins of a stator winding and contact connections of power electronics so as to drive the electric machine;

a second interconnection element configured to establish electrical contact between contact pins of a stator winding so as to create a star phase, the second interconnection element configured in a plane perpendicular to a rotational axis of the electric machine between a first radius and a second radius, the first radius and the second radius extending around the rotational axis, the first radius being smaller than the second radius, the second interconnection element forming three sections on the first radius and two loops between the first radius and the second radius; and a receiving element that centers and fixes the second interconnection element radially or circumferentially in a form-fitting manner, the receiving element comprising a plurality of centering domes centering and fixing the second interconnection element radially or circumferentially in a force-fit or form-fit, the plurality of centering domes comprising three centering domes, the three centering domes being arranged in one of the two loops, a first and third of the three centering domes circumferentially centering the second interconnection element, a second of the three centering domes radially centering the second interconnection element, the second of the three centering domes being disposed radially outwards of and circumferentially between the first and third of the three centering domes.

2. The high-voltage terminal according to claim 1, further comprising a plastic element surrounding the plurality of first interconnection elements at least in sections, wherein the plastic element centers and fixes the plurality of first interconnection elements in a materially bonded manner.

3. The high-voltage terminal according to claim 2, wherein the plastic element and the receiving element are integrally formed from a single component.

4. The high-voltage terminal according to claim 2, further comprising a mounting element configured to center and fix the high-voltage terminal on an element of the electric machine, wherein the element of the electric machine is a stator carrier.

5. The high-voltage terminal according to claim 4, wherein the mounting element has a bushing with a centering collar.

6. The high-voltage terminal according to claim 4, wherein the mounting element and the plastic element are integrally formed from one component.

7. The high-voltage terminal according to claim 1, wherein the plurality of centering domes are cylindrical.

8. The high-voltage terminal according to claim 1, wherein at least one of the plurality of first interconnection elements has a connection region to the contact connections of the power electronics, wherein the connection region and the power electronics are configured to establish a connection by a screw connection.

9. An electric machine comprising a high-voltage terminal according to claim 1.

10. A high-voltage terminal for a stator of an electric machine comprising:

a plurality of first interconnection elements configured to establish electrical contact between a plurality of contact pins of a stator winding and a plurality of contact connections of a set of power electronics to drive the electric machine;

a second interconnection element configured to establish electrical contact between the plurality of contact pins of the stator winding, the second interconnection element configured in a plane perpendicular to a rotational axis of the electric machine between a first radius and a second radius, the first radius and the second radius extending around the rotational axis, the first radius being smaller than the second radius, the second interconnection element forming three sections on the first radius and two loops between the first radius and the second radius; and a receiving element configured to center and fix the second interconnection element radially or circumferentially, the receiving element comprising a plurality of centering domes centering and fixing the second interconnection element radially or circumferentially in a force-fit or form-fit, the plurality of centering domes comprising three centering domes, the three centering domes being arranged in one of the two loops, a first and third of the three centering domes circumferentially centering the second interconnection element, a second of the three centering domes radially centering the second interconnection element, the second of the three centering domes being disposed radially outwards of and circumferentially between the first and third of the three centering domes.

11. The high-voltage terminal according to claim 10, further comprising a plastic element surrounding the plurality of first interconnection elements at least in sections, wherein the plastic element is configured to center and fix the plurality of first interconnection elements in a materially bonded manner.

12. The high-voltage terminal according to claim 11, wherein the plastic element and the receiving element are integrally formed from a single component.

13. The high-voltage terminal according to claim 10, wherein the plurality of centering domes are cylindrical.

14. The high-voltage terminal according to claim 10, wherein at least one of the plurality of first interconnection elements has a connection region to the plurality of contact connections of the set of power electronics, wherein the connection region and the set of power electronics are configured to establish a connection by a screw connection.

15. The high-voltage terminal according to claim 10, further comprising a mounting element configured to center and fix the high-voltage terminal on an element of the electric machine.

16. The high-voltage terminal according to claim 15, wherein the mounting element comprises a bushing with a centering collar.

17. An electric machine comprising:

a stator comprising a high-voltage terminal comprising:

a plurality of first interconnection elements configured to establish electrical contact between a plurality of contact pins of a stator winding and a plurality of contact connections of a set of power electronics to drive the electric machine;

a second interconnection element configured to establish electrical contact between the plurality of contact pins of the stator winding to generate a star phase, the second interconnection element configured in a plane perpendicular to a rotational axis of the electric machine between a first radius and a second radius, the first radius and the second radius extending around the rotational axis, the first radius being smaller than the second radius, the second interconnection element forming three sections on the first radius and two loops between the first radius and the second radius; and a receiving element configured to center and fix the second interconnection element radially or circumferentially, the receiving element comprising a plurality of centering domes centering and fixing the second interconnection element radially or circumferentially in a force-fit or form-fit, the plurality of centering domes comprising three centering domes, the three centering domes being arranged in one of the two loops, a first and third of the three centering domes circumferentially centering the second interconnection element, a second of the three centering domes radially centering the second interconnection element, the second of the three centering domes being disposed radially outwards of and circumferentially between the first and third of the three centering domes.

18. The electric machine according to claim 17, wherein the plurality of centering domes are cylindrical.

* * * * *